United States Patent [19]

Speet et al.

[11] Patent Number: 4,703,386
[45] Date of Patent: Oct. 27, 1987

[54] POWER RECEPTACLE AND ASSOCIATED FILTER

[75] Inventors: Larry A. Speet, Holland; Bruce A. Rentz, Kentwood, both of Mich.

[73] Assignee: Steelcase, Inc., Grand Rapids, Mich.

[21] Appl. No.: 618,562

[22] Filed: Jun. 8, 1984

[51] Int. Cl.⁴ .................... H02H 1/04; H02G 3/10
[52] U.S. Cl. .................... 361/56; 361/111; 361/118; 361/334; 174/49; 174/53
[58] Field of Search .................... 361/56, 58, 86, 111, 361/113, 118, 119, 332, 334, 91; 307/118–115, 147; 200/51.05, 51.11, 51.12; 339/21 R, 184 M; 174/48, 49, 53

[56] References Cited

U.S. PATENT DOCUMENTS

| | | | |
|---|---|---|---|
| 3,840,781 | 10/1974 | Brown | 361/56 |
| 3,928,737 | 12/1975 | Prasert | 200/51.05 |
| 4,231,630 | 11/1980 | Propst et al. | 174/48 X |
| 4,367,370 | 1/1983 | Wilson et al. | 174/48 |
| 4,376,561 | 3/1983 | Vanden Hock et al. | 339/21 R |
| 4,438,303 | 3/1984 | Astrer | 200/51.11 X |

*Primary Examiner*—A. D. Pellinen
*Assistant Examiner*—Derek S. Jennings
*Attorney, Agent, or Firm*—Price, Heneveld, Cooper, DeWitt & Litton

[57] ABSTRACT

A receptacle for use in a modular office panel power supply system includes a plurality of outlets at least one of which can be selectively electrically isolated from the remaining outlets for filtering of the isolated outlet. In one embodiment, the system includes a line conditioner having a cam which, when mechanically and electrically coupled to the receptacle, couples a surge protection circuit in parallel with each of the outlets of the receptacle and a line conditioning R.F.I./E.M.I. filter only in series with the isolated outlet for supplying power to a computer.

23 Claims, 9 Drawing Figures

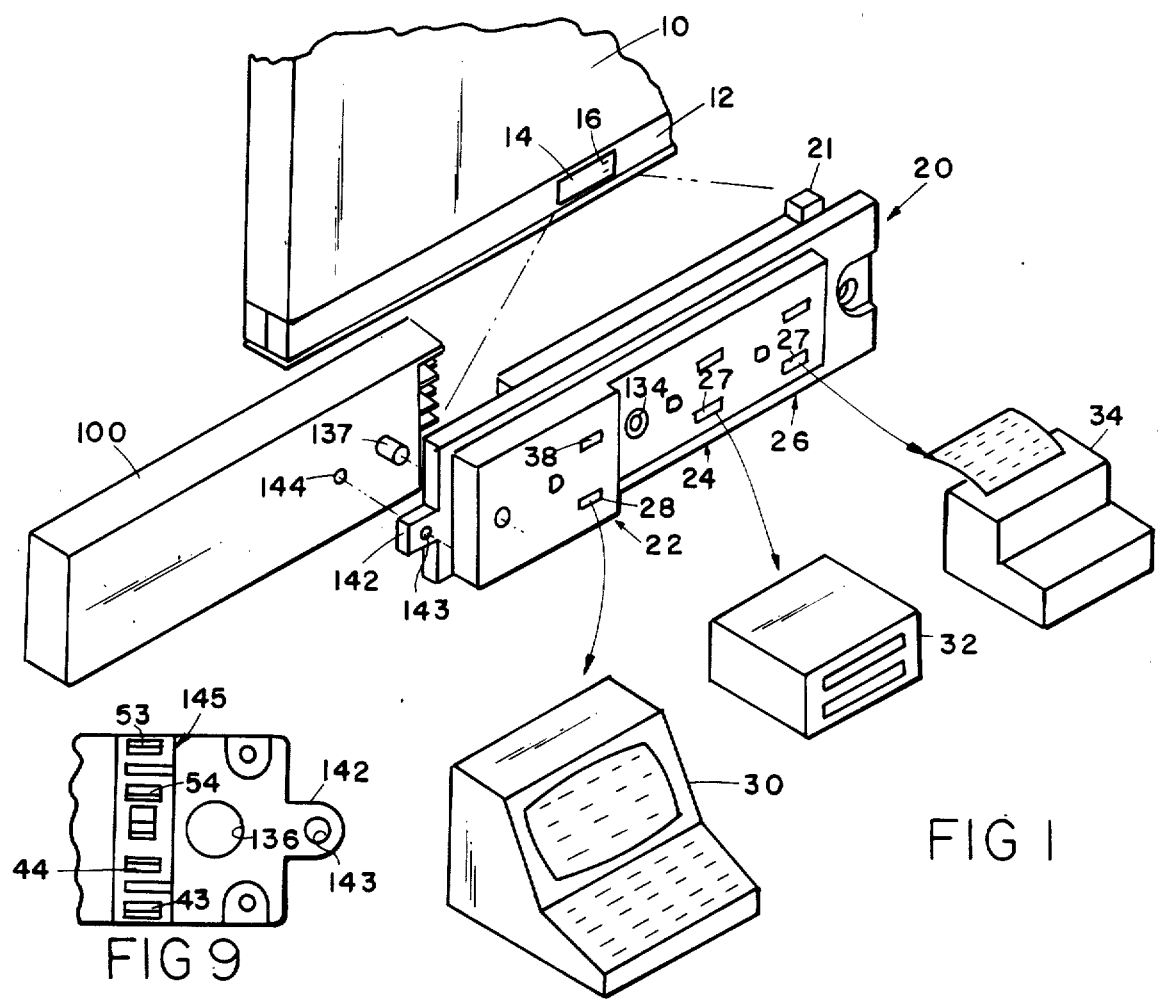
FIG 9
FIG 1
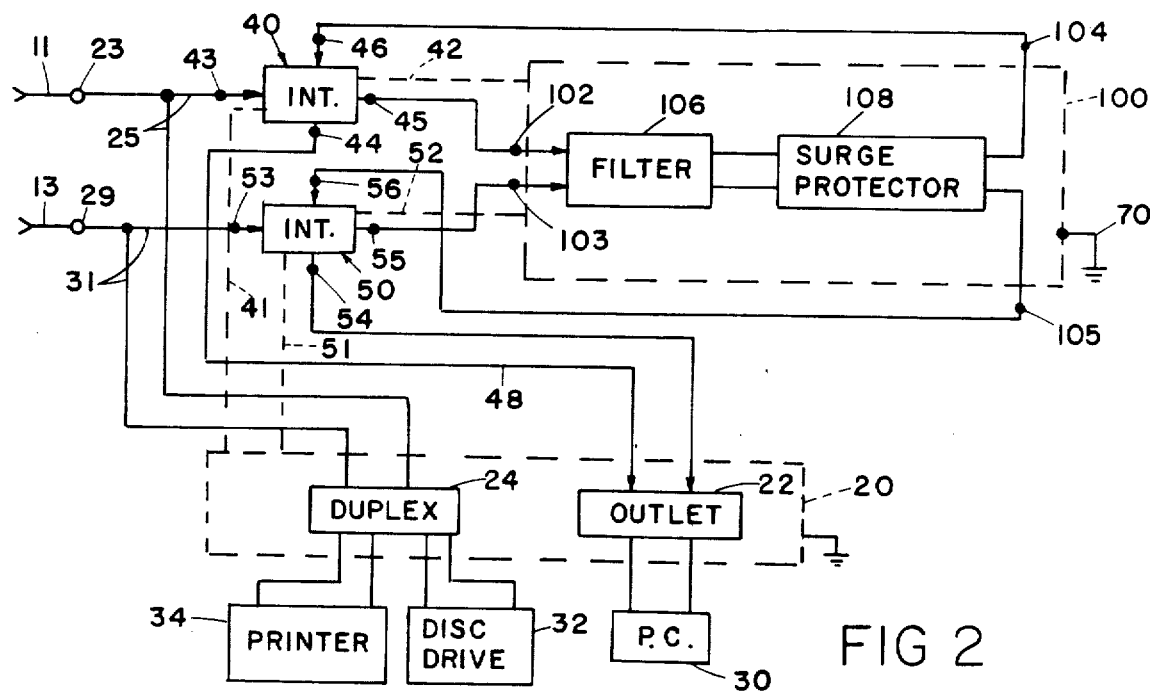
FIG 2

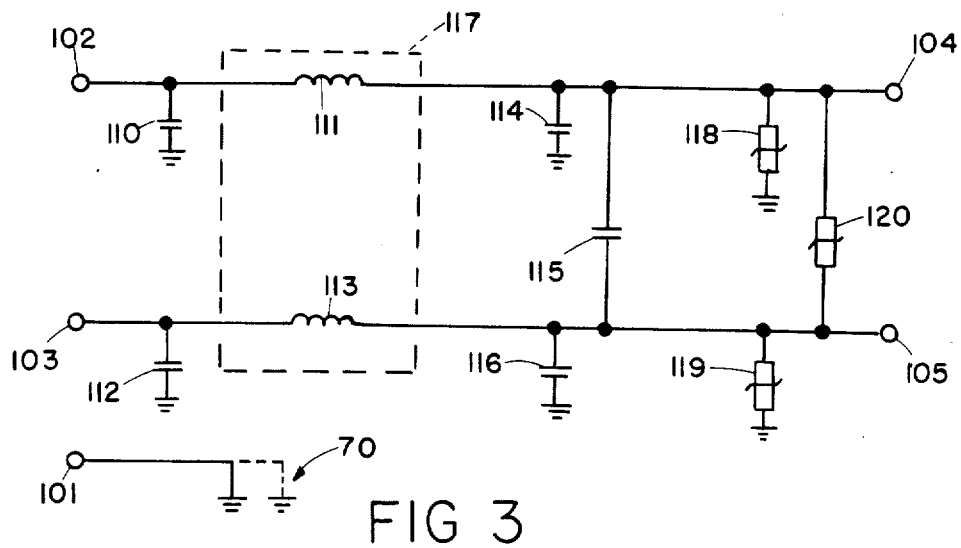
FIG 3
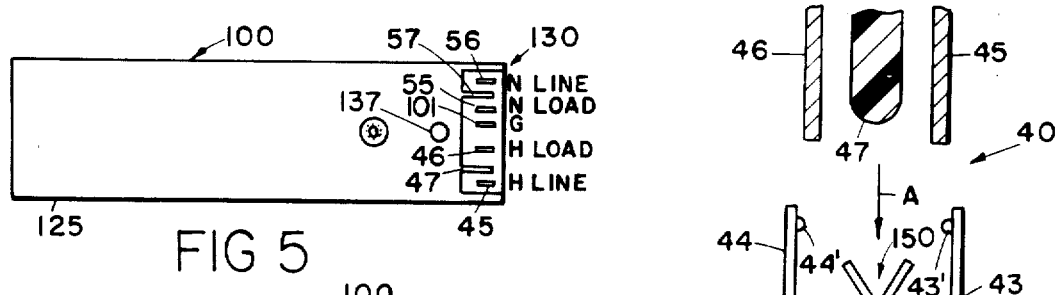
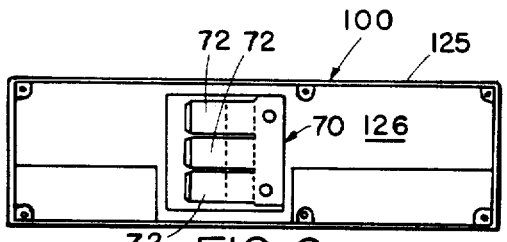
FIG 5
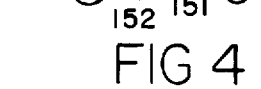
FIG 6
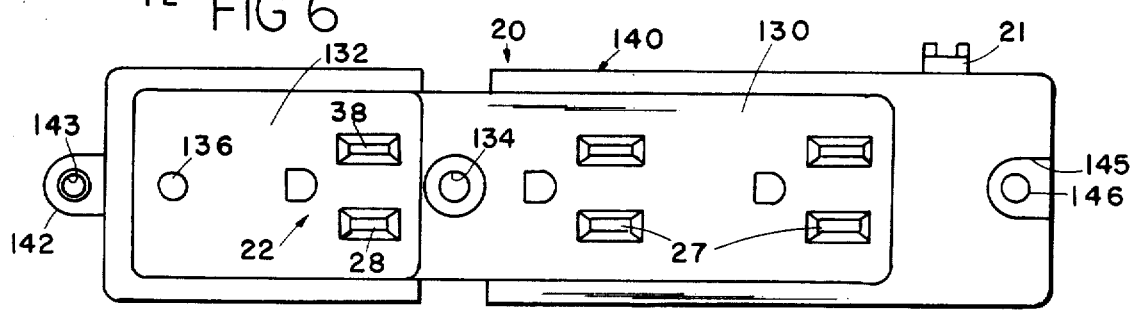
FIG 7
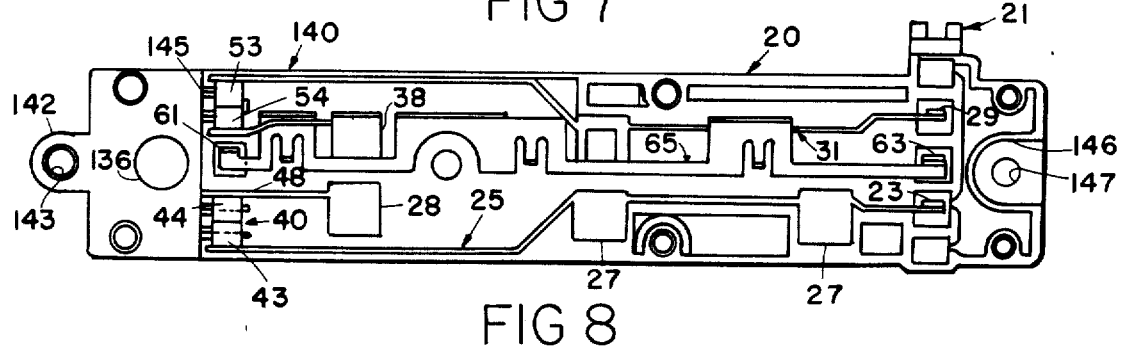
FIG 8

POWER RECEPTACLE AND ASSOCIATED FILTER

BACKGROUND OF THE INVENTION

The present invention relates to a modular power receptacle and one which is adapted to receive a line conditioner module selectively filtering power supplied to one or more outlets of the receptacle.

In modern office designs in which panel wiring of the type disclosed, for example, in U.S. Pat. No. 4,376,561, issued Mar. 15, 1983, frequently, the work station defined by the panels employs computer equipment. Such equipment may include, for example, a personal computer terminal with a keyboard, monitor and microprocessor; a separate disk drive for the terminal; and a printer. All of the computer equipment is sensitive to power surges which frequently occur and which can destroy electrical components particularly integrated circuits. Further, the microprocessor and its associated circuitry contained within the personal computer is particularly-sensitive to other power line voltage variations including E.M.I. (electromagnetic interference) and R.F.I. (radio frequency interference). The causes and deleterious effects of these additional power line disturbances is well known, and a line conditioning circuit frequently is used to isolate and filter the power source for at least the personal computer.

A variety of line conditioning circuits are available which plug into the front of a conventional wall outlet for use in connection with personal computing equipment. Such line filters typically include both a surge suppression circuit as well as a low pass circuit for each of the outlets associated with the device. Thus, although filtering is available for the personal computer user, in the office environment, the use of such add-on filters in addition to the integrated power receptacles in the paneling system is costly, particularly where the somewhat unnecessary line conditioning and filtering is provided at all outlets including those for use with disk drives and printers which typically do not require the degree of protection necessary for the personal computer itself. Further, the line conditioning and surge protection filter system available typically are plugged into existing outlets and do not aesthetically integrate well with an office panel system with integrated power distribution systems included in the paneling. Further, they can be easily removed from a work station by individuals with or without larcenous intent thereby leaving the computing equipment unprotected sometimes without the knowledge of the operator.

SUMMARY OF THE PRESENT INVENTION

The system of the present invention provides a unique receptacle for use in a modular office panel power supply system. The receptacle includes a plurality of outlets at least one of which can be selectively electrically isolated from the remaining outlets for filtering of the isolated outlet. In one embodiment, the system includes a line conditioner having a cam which, when mechanically and electrically coupled to the receptacle, couples a surge protection circuit in parallel with each of the outlets of the receptacle and a line conditioning R.F.I./E.M.I. filter only in series with the isolated outlet for supplying power to a computer. According to another aspect of the invention, means are provided for indicating when the line conditioner is installed such that the user is certain of the existence of the protection afforded by the line conditioner. The receptacle can thus be used as a normal receptacle or a filtered receptacle with the user knowing at a glance which mode is being employed.

In a preferred embodiment of the invention, the receptacle includes at least a pair of normally closed switch contacts which interact with a cam associated with a line conditioner for opening the power supply lines to at least one of the outlets associated with the receptacle and rerouting the line through the filter, and subsequently back to the other contact of the pair of contacts. With such a system, therefore, a modular receptacle can be employed in an existing office panel construction with a filter selectively added to provide the protection necessary only for the equipment needing such protection.

These and other features, objects and advantages of the present invention will become apparent upon reading the following description thereof together with reference to the accompanying drawings in which:

BRIEF DESCRIPTION OF THE DRAWINGS

FIG. 1 is a fragmentary, perspective view of an office installation embodying the present invention;

FIG. 2 is an electrical circuit diagram in block form of a system embodying the present invention;

FIG. 3 is an electrical circuit diagram in schematic form of a line conditioner embodying the present invention;

FIG. 4 is a greatly enlarged, fragmentary, cross-sectional view of a portion of the receptacle and line conditioner;

FIG. 5 is a slightly reduced sized, front elevational view of the line filter embodying the present invention;

FIG. 6 is a rear elevational view of the line filter shown in FIG. 5;

FIG. 7 is a front elevational view of a power receptacle embodying the present invention;

FIG. 8 is a front elevational view of the structure shown in FIG. 7 with the front cover removed showing the electrical conductors contained therein; and FIG. 9 is a fragmentary rear view of a portion of the power receptacle.

DETAILED DESCRIPTION OF THE PREFERRED EMBODIMENT

Referring initially to FIG. 1, there is shown an office installation embodying the present invention in which an office panel 10 includes an electrical power raceway 12 generally of the type disclosed in U.S. Pat. No. 4,376,561, the disclosure of which is incorporated herein by reference. The raceway thus includes a plurality of conductors extending along the bottom of the panel 10 in an appropriate channel and includes, at spaced intervals therealong, openings 14 for receiving plug-in electrical receptacles. In the past, such receptacles have been duplex receptacles which plug directly into power supplying connectors mounted in raceway 12 and aligned with an opening. The system described in the above identified patent provides one or more power lines for different types of office equipment to be powered by the conductors as well as means for electrically interconnecting panels to form separate work areas.

In the embodiment shown in FIG. 1, a unique triplex receptacle 20 is adapted to fit within aperture 14 formed in the raceway 12 and plug into connector 16 for providing electrical operating power to the receptacle 20. Further, the triplex receptacle 20 is adapted to optionally receive a line conditioner 100 for selectively providing filtered and surge protection output power to the triplex receptacle 20. In the embodiment shown, receptacle 20 includes three separate power output sockets 22, 24 and 26 with output 22 being filtered for E.M.I. and R.F.I. interference as well as being surge protected for connection of a personal computer 30 thereto. Sockets 24 and 26, on the other hand, are protected only for voltage surges and are particularly adapted for connection of a disk drive unit 32 or printer 34 associated with the computerized office.

Receptacle 20 includes a plug 21 located at its rear corner for connection to socket 16 in raceway 12 to provide operating power to sockets 22, 24 and 26 either directly when line conditioner 100 is not intercoupled to receptacle 20 or selectively with the filtering and surge protection noted above when line conditioner 100 is plugged into receptacle 20 and the combined unit installed within raceway 12. As seen in FIG. 1, line conditioner 100 is positioned behind and to the left of receptacle 20 and is concealed within raceway 12 by inserting the conditioner 100 and in aperture 14 and moving the conditioner 100 and attached receptacle 20 to the left as viewed in FIG. 1. When so installed, the receptacle 20 is aligned within the aperture and the conditioner which is positioned generally behind and to the left of the receptable is contained within the raceway and is not visible. Plug 21 and socket 16 can be of the type described in the above identified patent to provide a ground connection between raceway 12 and receptacle 20, a neutral connection and a line connection also commonly referred to as the "hot" connection for the receptacle. Having briefly described the environment and application of the unique receptacle 20 and line conditioner 100, a detailed description of the electrical circuit for the line conditioner 100 and its interconnection with receptacle 20 is provided followed by an electrical/mechanical description of the receptacle 20 and the line conditioner.

The interface between the receptacle 20 and line conditioner 100 is unique in that it provides interruption means for the otherwise parallelly connected sockets 22, 24 and 26 and inserts the line conditioner 100 selectively coupling certain portions of the line conditioner to selected ones of the sockets. Referring initially to FIG. 2, there is schematically shown the line input conductor 11 and a neutral conductor 13 of the electrical system, it being understood that a separate ground conductor also is coupled to the ground contacts of the sockets of receptacle 20.

Line conductor 11 is coupled to the receptacle 20 by a pin 23 (FIG. 8) on plug 21 and is coupled by a preformed conductor 25 contained within housing 140 of receptacle 20 to each of the line contacts 27 of receptacles 24 and 26 and to an interruptable contact 40 associated with the line contact 28 of socket 22. The interruptable contact assembly 40 is represented in block form in FIG. 2 and is substantially identical to an interruptable contact 50 associated with the neutral input conductor 13 coupled to a configurated conductor 31 by input pin 29 on plug 21 (FIG. 8). Conductors 25 and 31 are coupled directly to the associated contacts of outlets 24 and 26, illustrated as a duplex outlet in FIG. 2, which includes contacts which are coupled permanently in parallel relationship to each other. Outlet 22, on the other hand, is either coupled in parallel with outlets 24 and 26 or isolated and coupled to input lines 11 and 13 through line conditioner 100.

The circuit interruption means 40 and 50 can take on a variety of forms, however, in the preferred embodiment, are electromechanically coupled contacts associated both with the receptacle 20, as indicated by dashed lines 41 and 51 in FIG. 2, and with the line filter 100, as indicated by the dashed lines 42 and 52. Thus, in the preferred embodiment of the invention, the interruption circuit means 40 and 50 are actuated by the insertion of the line conditioner 100 into the receptacle 20. The operation of the interruption means can be seen by reference to FIG. 2 which illustrates circuit 40 as including an input terminal 43 directly coupled to conductor 25 and an output terminal 44 which, in turn, is directly coupled to the line contact 28 of socket 22 via conductor 48. When conditioner 100 is not plugged into receptacle 20, circuit 40 effectively short circuits terminals 43 and 44 to coupled line 11 directly to contact 28 of outlet 22 via conductor 44.

The circuit interrupter 40 includes another output terminal 45 which is selectively coupled to terminal 43 upon insertion of conditioner 100 to receptacle 20 for coupling conductor 25 directly to an input terminal 102 of conditioner 100. A line output terminal 104 of conditioner 100 is coupled to an input terminal 46 of interrupter circuit 40 which, when conditioner 100 is inserted into receptacle 20 is coupled directly to output terminal 44. Thus, when the line conditioner is inserted into receptacle 20, terminals or contacts 43 and 45 are directly coupled while contacts 46 and 44 are coupled to one another. This couples the line input terminal 23 to the outlet line contact 28 through the line conditioner circuit 100. When the conditioner is not inserted into receptacle 20, however, contacts 43 and 44 are coupled to bypass line conditioner 100 and provide a direct parallel coupling of outlet 22 to outlets 24 and 26. Interrupter circuit 50 operates in substantially identical fashion and is shown with the same least significant digit terminal identifications with the output terminal 55 of interrupter circuit 50 being coupled to a neutral input terminal 103 of conditioner 100, and output terminal 105 of conditioner 100 being coupled to an input terminal 56 of interrupter circuit 50.

The line conditioning circuit 100 includes an R.F.I.-/E.M.I. filter 106 having its output terminals coupled to the input terminals of a surge protector circuit 108. Filter 106 and protection circuit 108 forming the line conditioner circuit 100 are shown in detail in FIG. 3, now described.

The R.F.I./E.M.I. filter 106 includes a pair of input capacitors 110 and 112 coupled from input terminals 102 and 103, respectively, to ground. Coupled in series with terminals 102 and 103 are a pair of inductors 111 and 113 each having one input terminal coupled to a capacitor 110 and 112, respectively, and an output terminal coupled to output capacitors 114 and 116, respectively. The remaining terminals of capacitors 114 and 116 are coupled to ground, as shown in FIG. 3. A common mode bypass capacitor 115 extends between the output terminals of inductors 111 and 113 which are commonly wound on a toroidal core 117, as illustrated by the dotted lines in FIG. 3. The LC pi filter so defined provides a low pass filter which rejects, or bypasses, to ground the higher frequencies present in radio frequency interference or electromagnetic interference while freely passing the 50–60 Hz line frequency power.

The line conditioner 100 also includes the surge protection circuit comprising three varistors, with the first varistor 118 having one terminal coupled to output terminal 104 and the remaining terminal coupled to ground. A second varistor 119 has one terminal coupled to output terminal 105 and its remaining terminal coupled to ground, while the third varistor 120 is coupled between output terminals 104 and 105. The varistors prevent either of output terminals 104 or 105 from exceeding a predetermined voltage above ground level or with respect to each other. The values of the components of the E.M.I./R.F.I. filter as well as the varistors are conventional and each component is commercially available.

The ground shown in FIG. 3 is electrically coupled via a terminal 101 to a ground pin 61 (FIG. 8) in receptacle 20 which, in turn, is coupled via a ground conductor 65 and connection pin 63 of plug 21 to the ground conductor in the raceway via socket 16. Additionally, circuit 100 includes a radio frequency ground contact 70 (FIG. 6) mounted to the back and shown schematically in phantom form in FIG. 3. Ground contact t0 is also coupled to ground conductor 65 of the receptacle via contact 101.

It is noted that the line conditioner circuit 100 when coupled to the receptacle 20 inserts the electrical circuit path from terminal 102 to output terminal 104 in series with the line terminal 28 of outlet 22 and the circuit path from terminal 103 to output terminal 105 in series with the neutral contact 38 of the outlet. This effectively couples filter 106 and surge protector 108 in series with outlet 22. The surge protector circuit comprising the varistors are coupled electrically across terminals 102 and 103 through inductors 111 and 113, and therefore, also provide surge protection for the parallel coupled duplex outlets 24 and 26 which are coupled to input terminals 102 and 103. Filter 106, however, is not coupled to outlets 24 and 26 inasmuch as the devices plugged into such outlets are not as sensitive to high frequency interference as the microprocessor contained in personal computer 30. Having described the electrical circuitry comprising the receptacle and line conditioner, a description of the physical structure of the two units is now presented in conjunction with FIGS. 1 and 4–9.

FIG. 4 best illustrates the operation of the interruption circuit means 40 and 50 in the preferred embodiment of the invention. In FIG. 4, a normally closed switch is shown comprising spring contacts 43 and 44 which are mirror image, generally J-shaped conductive members. Contact 43 is integrally formed at the end of conductor 25, shown in FIG. 8, and contact 44 integrally formed with and coupled to outlet contact 28 by an intermediate section 48. Contact 43 includes, at its upper, inner end, a raised portion 43' for engaging the outer edge of contact 45 extending from plug 130 associated with line conditioner 100, as best seen in FIG. 5. Similarly, contact 44 includes a raised section 44' which engages contact 46 associated with line conditioner 100 when the line conditioner is plugged into the connector 145 (FIG. 9) at the rear of receptacle 20. The receptacle housing 140 is molded of a polymeric material, such as polycarbonate, which supports the contacts 43, 44, 61, 53 and 54 in spaced relationship aligned with a plurality of slots defining connector 145 which are aligned with the contacts of plug 130 such that the associated contacts on line conditioner 100 and receptacle 20 engage in electrical and mechanical contact when conditioner 100 is inserted into receptacle 20.

As the conditioner is plugged into receptacle 20 in a direction indicated by arrow A in FIG. 4, a pair of cams 47 and 57 (FIG. 5) spread apart contacts 43 and 44 and 53 and 54, respectively, decoupling input 43 from output 44 and input 53 from output 54, as seen in FIG. 2. This isolates the outlet 22 from inlet terminals 23 and 29 while at the same time coupling contact 43 to contact 45 and contact 44 to contact 46 and the associated contacts of the neutral side of line for inserting the line conditioner 100 in series between the input conductors 11 and 13 and outlet 22. Thus, the interrupter circuits 40 and 50 decouple the outlet 22 from outlets 24 and 26 and recouple the outlet through conditioner 100 by the electrical/mechanical connection of the two units. Cams 47 and 57 include a rounded tip which engages a V-shaped section 150 formed at the facing tips of each of the contacts 43, 44 and 53, 54 to spread apart the contacts sufficiently such that the contacting tips 151 and 152 will be separated to provide the electrical isolation while at the same time raised portions 43' and 44' will securely engage the outer edges of contacts 45 and 46. The neutral contact pair 53 and 54 are constructed in a substantially identical shape and operate in the same fashion.

The line conditioner also includes a molded polymeric body 125 and cams 47 and 57 are integrally molded therein and extend between contacts 45 and 46 and contacts 55 and 56, as shown in FIG. 5.

The radio frequency ground contact 70, shown in FIG. 6, comprises a beryllium copper strip formed as three outwardly deflected fingers 72 which extend rearwardly from the back 126 of conditioner 100 to engage the metallic raceway 12 and provide an additional ground for the filter 100 directly to the metallic raceway. This ground is also coupled to the electrical ground wire for the conductors contained within raceway 12 via contact 101 of plug 130 and contact 61 associated with connector 145 of receptacle 20.

Receptacle 20 includes a cover plate 130 with apertures aligned with each of the neutral and line contacts and ground and apertures aligned with the ground contacts in a conventional plug arrangement. The cover 130 includes a raised plateau 132 on socket 22 for indicating that it is a special purpose, high frequency, filtered socket for use with the personal computer 30. Cover 130 also includes a threaded aperture 134 for receiving a strain relief strap which can be used in connection with the plug for the personal computer also preventing accidental removal of the plug which could result in the loss of information in temporary memory.

The receptacle 20 also includes an aperture 136 extending entirely through the structure for defining in connection with the line conditioner means indicating that the line conditioner is installed. The line conditioner 100 accordingly includes an outwardly projecting cylindrical rod or post 137 which indexes to and aligns with aperture 136 extending through receptacle 20 to assist in the alignment of the two units and also extend to the surface of aperture 136 to provide a visible indicia that the line conditioner has been installed. For this purpose, the circular end surface of posts 137 can be of a color which contrasts sharply with the color of plateau 132 or, if desired, an LED can be mounted within the post 137 and activated upon the application of power to line conditioner 100 for providing an additional visible indicia indicating the activation of the filter.

The housing 140 to which cover 130 is removably secured in a conventional manner includes a tang 142 at one end including an aperture 143 for receiving a fastening screw which extends therethrough and into a threaded aperture 144 in line conditioner 100 for mechanically securing the two units for installation. The opposite end of housing 140 also includes a recess 146 and aperture 147 for securing the receptacle to the raceway 12. When the line conditioner and receptacle are secured together, the line conditioner is first inserted behind aperture 14 such that it is concealed within raceway 12 with only the triplex receptacle 20 being exposed once the system is installed. The indicia 137 will indicate to the user of the office that the circuit is protected against voltage surges and high frequency interference.

The interior of the receptacle housing 140 conventionally includes a plurality of contact supporting islands and projections not shown in FIG. 8 for purposes of clearly illustrating the contact construction. The structure of such housing is, however, conventional only in supporting the contacts and conductors and in permitting the necessary deflection of the interruptable contacts 43 and 44 and 53 and 54.

It will become apparent to those skilled in the art that various modifications to the preferred embodiments of the present invention as described herein can be made without departing from the spirit or scope hereof as defined by the appended claims.

The embodiments of the invention in which an exclusive property or privilege is claimed are defined as follows:

1. An electrical receptacle for installation in an electrical raceway in a modular office panel, said raceway including an electrical supply conductor for supplying electrical power to said receptacle, said receptacle comprising:
    a housing shaped to be mounted in a raceway of a modular office panel including a plurality of electrical outlets mounted therein said housing integrally included outlet coupling means within said housing for electrically coupling said outlets in parallel relationship, said outlet coupling means responsive to means selectively contained by the raceway for electrically isolating at least one of said outlets from the remaining outlet of said housing; and
    means for coupling said outlet coupling means to a conductor for receiving electrical power therefrom.

2. The receptacle as defined in claim 1 wherein said outlet coupling means includes at least a pair of normally closed contacts coupled between said at least one outlet and said remaining outlet, said contacts shaped to receive a cam for opening said contacts to isolate said at least one outlet.

3. The receptacle as defined in claim 2 wherein said pair of contacts comprises conductive strips of material formed to include a contacting segment and further including outward diverging sections for receiving a cam actuator to separate said strips thereby opening said contacts.

4. The receptacle as defined in claim 3 and further including mechanical means for visually displaying the closure status of said pair of contacts.

5. The receptacle as defined in claim 4 wherein said means for coupling said outlet coupling means comprises plug means for electrically coupling said outlet coupling means to a conductor.

6. In combination with said receptacle as defined in claim 2, cam means including a second pair of electrical contacts, said cam means and second pair of contacts shaped to engage said normally closed contacts for coupling one of said contacts of said second pair of contacts to one of said normally closed contacts and the other of said contacts of said second pair of contacts with the other of said normally closed contacts.

7. A line conditioner for use in connection with a modular multiple outlet receptacle in an office divider panel, said line conditioner comprising:
    input terminal means for coupling to a source of line voltage and output terminal means for providing a condition voltage output;
    a filter for filtering out E.M.T. and R.F.I. frequency interference, said filter coupled betwewen said input and output terminal means;
    a surge protection circuit coupled to said filter for preventing excessive voltage surges; and
    a receptacle and means interconnecting said line conditioner to said receptacle behind said receptacle for concealed installation of said line conditioner within a panel, wherein said receptacle includes an aperture and said line conditioner includes post means extending into said aperture when said line conditioner is installed for providing a visible indicia indicating that said line conditioner is coupled to said receptacle.

8. The line conditioner as defined in claim 7 wherein said receptacle includes a plurality of outlets and further including interruption circuit means for isolating at least one outlet and inserting only said filter in series with the one outlet when said line conditioner is connected to the receptacle.

9. A line conditioner for use in connection with a modular multiple outlet receptacle in an office divider panel, said line conditioner comprising:
    input terminal means for coupling to a source of line voltage and output terminal means for providing a condition voltage output;
    a filter for filtering out E.M.I. anmd R.F.I. frequency interference, said filter coupled between said input and output terminal means;
    a surge protection circuit coupled to said filter for preventing excessive voltage surges; and
    a receptacle and means interconnecting said line conditioner to said receptacle behind and to one side of said receptacle for concealed installation of said line conditioner within a panel, wherein said receptacle includes a plurality of outlets and further including interruption circuit means for isolating at least one outlet and inserting only said filter in series with the one outlet when said line conditioner is connected to the receptacle; and, wherein said interruption circuit means includes cam means formed on said line conditioner and cooperating with cam operated switch means located on said receptacle for actuation of the cam operated switch means for isolating the one outlet when said line conditioner is coupled to said receptacle.

10. The line conditioner as defined in claim 9 wherein said interruption circuit means further includes a pair of electrical contacts mounted with respect to said cam means for engaging contacts of the cam operated switch means of said receptacle when said line conditioner is connected to said receptacle.

11. The line conditioner as defined in claim 10 wherein said surge protection circuit is coupled to all outlets of said receptacle when said line conditioner is connected to said receptacle.

12. The line conditioner as defined in claim 11 wherein said line conditioner includes visible means for indicating when the concealed line conditioner is connected to said receptacle.

13. A modular selectively conditioned electrical supply system for installation within an electrical raceway including a source of line voltage comprising:
   a receptacle including at least one outlet and further including means for coupling said outlet to a source of line voltage; and
   a line conditioner for conditioning power supplied by said outlet, said conditioner including means for electrically and mechanically coupled to said receptacle with said conditioner position generally behind said receptacle such that it is concealed within the raceway when installed, said receptacle integrally including switch means responsive to the installation of said line conditioner to couple said conditioner to said outlet and responsive to the absence of said line conditioner to allow said outlet of said receptacle to be used for supplying power without said line conditioner installed.

14. The system as defined in claim 13 wherein said responsive means includes switch means for selectively electrically isolating at least one outlet from the remaining outlets and wherein said line conditioner includes means for actuating said switch means when coupled to said receptacle and contact means for coupling said line conditioner to at least said one outlet.

15. A modular selectively conditioned electrical supply system for installation within an electrical raceway including a source of line voltage comprising:
   a receptacle including a plurality of outlets and further including mens for coupling said outlets to a source of line voltage; and
   a line conditioner for conditioning power supplied by said outlets, said conditioner including means for electrically and mechanically coupling to said receptacle with said conditioner position generally behind and to one side of said receptacle such that it is concealed within the raceway when installed, said receptacle including means responsive to the installation of said line conditioner to couple said conditioner to at least one of said outlets and responsive to the absence of said line conditioner to allow said receptacle to be used for supplying power without said line conditioner installed, wherein said responsive means includes switch means for selectively electrically isolating at least one outlet from the remaining outlets and wherein said line conditioner includes means for actuating said switch means when coupled to said receptacle and contact means for coupling said line conditioner to at least said one outlet, and wherein said actuating means comprises a cam and wherein said switch means comprises a pair of contacts separated by said cam when said line conditioner is connected to said receptacle and said contact means engages said pair of contacts.

16. The system as defined in claim 15 wherein said source of line voltage includes a plurality of conductors and said line conditioner and said receptacle include a cam and associated contact means and switch means respectively for each of said conductors.

17. The system as defined in claim 13 wherein said receptacle includes an aperture extending therethrough wherein said line conditioner includes a post aligned with and extending into said aperture when said line conditioner is installed to provide visible indicia that said line conditioner is installed.

18. A modular selectively conditioned electrical supply system for installation within an electrical raceway of an office panel comprising:
   a receptacle including a plurality of outlets facing outwardly from a front surface thereof and means for coupling said outlets to a source of line voltage, said receptacle further including a rear surface and an aperture extending through said receptacle between said front and rear surfaces; and
   a line conditioner for conditioning power supplied by said outlets, said conditioner removably connected with respect to said receptacle in such a manner as to be concealed within the panel when installed said conditioner further including post extending within said aperture to provide a visible indication to users of the receptacle that said line conditioner is installed.

19. The system as defined in claim 18 wherein said extending means comprises a post on a surface of said line conditioner to extend from the rear surface of said receptacle substantially to the front surface thereof.

20. The system as defined in claim 19 wherein the end of said post remote from said line conditioner contrasts with the front surface of said receptacle so as to be clearly visible.

21. A selectively filtered receptacle module for use in an office panel for providing operating power to electronic equipment such as computers comprising:
   a receptacle including a plurality of outlets and switch means for isolating at least one of said outlets from the remaining outlets, said receptacle including a first connector for coupling the receptacle to a raceway power supply connector contained in the panel and a second connector for coupling to a line conditioner, wherein said switch means comprises a pair of normally closed contacts extending within said second connector to be opened and reconnected to the line conditioner upon connection of the line conditioner to the receptacle whereby said at least one outlet is filtered by said line conditioner.

22. The receptacle as defined in claim 21 in combination with a line conditioner, said line conditioner including a cam for engaging and separating said pair of switch contacts and contact means for engaging said pair of switch contacts for electrically coupling said line conditioner to said receptacle.

23. The receptacle as defined in claim 22 and further including means for visually displaying the closure status of said pair of contacts.

* * * * *

UNITED STATES PATENT AND TRADEMARK OFFICE
CERTIFICATE OF CORRECTION

PATENT NO. : 4,703,386

DATED : October 27, 1987

INVENTOR(S) : Larry A. Speet and Bruce A. Rentz

It is certified that error appears in the above-identified patent and that said Letters Patent is hereby corrected as shown below:

Column 3, Line 29:
"receptable" should be --receptacle--

Column 3, Line 56:
"receptacle 20" should be --receptacle--

Column 5, Line 23:
"Ground contact +0" should be --Ground contact 70--

Column 8, Claim 7, Line 19:
"E.M.T." should be --E.M.I.--

Column 8, Claim 7, Line 20:
"betwewen" should be --between--

Column 8, Claim 9, Line 45:
"anmd" should be --and--

Column 9, Claim 15, Line 41:
"mens" should be --means--

Signed and Sealed this

Seventh Day of June, 1988

Attest:

DONALD J. QUIGG

Attesting Officer

Commissioner of Patents and Trademarks